(12) United States Patent
Kim et al.

(10) Patent No.: US 7,535,954 B2
(45) Date of Patent: May 19, 2009

(54) METHOD AND APPARATUS FOR PERFORMING CHANNEL EQUALIZATION IN COMMUNICATION SYSTEMS

(75) Inventors: Min-Ho Kim, Suwon (KR); Jae-Hong Park, Seoul (KR); Jung-Wha Chung, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 1270 days.

(21) Appl. No.: 10/659,286

(22) Filed: Sep. 11, 2003

(65) Prior Publication Data

US 2004/0101075 A1 May 27, 2004

(30) Foreign Application Priority Data

Nov. 23, 2002 (KR) ............... 10-2002-0073325

(51) Int. Cl.
*H03H 7/30* (2006.01)
(52) U.S. Cl. .............. 375/229; 375/232; 708/322
(58) Field of Classification Search ......... 375/229, 375/232, 350; 708/322, 323
See application file for complete search history.

(56) References Cited

U.S. PATENT DOCUMENTS

| | | | | | |
|---|---|---|---|---|---|
| 5,392,315 | A | * | 2/1995 | Laud | 375/232 |
| 5,675,394 | A | * | 10/1997 | Choi | 348/614 |
| 5,777,910 | A | * | 7/1998 | Lu | 708/323 |
| 6,151,614 | A | * | 11/2000 | Ikeda | 708/322 |
| 6,385,239 | B1 | * | 5/2002 | Okamoto et al. | 375/232 |
| 6,483,872 | B2 | * | 11/2002 | Nguyen | 375/231 |
| 6,563,868 | B1 | * | 5/2003 | Zhang et al. | 375/232 |
| 6,606,641 | B1 | * | 8/2003 | Wittig et al. | 709/319 |
| 7,127,019 | B2 | * | 10/2006 | Koslov | 375/371 |
| 2005/0053127 | A1 | * | 3/2005 | Shiue et al. | 375/232 |

FOREIGN PATENT DOCUMENTS

JP 2001-196978 A 7/2001

* cited by examiner

*Primary Examiner*—Temesghen Ghebretinsae
(74) *Attorney, Agent, or Firm*—Harness, Dickey & Pierce, P.L.C.

(57) ABSTRACT

A method and apparatus for performing channel equalization in a communication system may potentially reduce power consumption in channel equalizers of communication systems. A filtering circuit filters a received data sequence as a plurality of data values to be stored in a plurality of filter cells. Each filter cell may store at least one data value and may contain a coefficient related to the stored data value. A coefficient updating circuit may update the coefficients based on at least one parameter, and may compare the updated coefficients to a threshold. Based on the comparison, filter cells of selected coefficients may be selected for restoring the received data sequence to its original state.

20 Claims, 3 Drawing Sheets

METHOD AND APPARATUS FOR PERFORMING CHANNEL EQUALIZATION IN COMMUNICATION SYSTEMS

PRIORITY STATEMENT

This application claims the priority of Korean Patent Application No. 2002-73325 filed 23 Nov. 2002, in the Korean Intellectual Property Office, the disclosure of which is incorporated herein in its entirety by reference.

BACKGROUND OF THE INVENTION

1. Field of the Invention

The present invention relates to a channel equalizing method and channel equalizer in a digital communication system.

2. Description of the Related Art

Channel equalization is a signal processing technique typically used in a digital communication system. Channel equalization is typically performed in a digital communication system in order to prevent the occurrence of channel noise, channel distortion, multi-path error and multi-user interference, thereby improving system performance. Channel equalizers may typically be found in household appliances such as digital TVs and personal communication systems. The use of a variety of different types of channel equalizers in household appliances such as described above may increase a carrier interference to noise ratio, known as a signal-to-noise ratio (SNR) and reduce a symbol error rate (SER) of an input signal.

The Advanced Television Systems Committee (ATSC) provides standards for digital high-definition television (HDTV). The ATSC document A53, dated Sep. 16, 1995 describes an approved standard for digital TV. This standard specifies specific training sequences that are incorporated into video signals transmitted over a terrestrial broadcast, cable and/or satellite channel, etc.

ATSC document A54, dated Oct. 4, 1995, describes general implementation of this standard. ATSC document A54 discloses a method of adapting on equalizer's filter response of an equalizer to adequately compensate for channel distortion. This method may be disadvantageous, however, in that there is a higher probability that coefficients which are set in the equalizer are not set so as to adequately compensate for channel distortion which may be present as the equalizer first operates (i.e., upon start-up or initialization of the equalizer).

To force a convergence of the equalizer coefficients, a well-known 'original training sequence' is transmitted. An error signal is formed by subtracting a locally generated copy of the training sequence from the output of the equalizer. The coefficients are set so as to minimize the error signal. After adaptation of the equalizer with the training signal, the equalizer may be used for filtering a video signal, for example.

In general, linear filters are used for channel equalization. Feedback-type non-linear filters are also commonly used in order to effectively remove impulse noise and non-linear distortion present in a communication channel, so as to improve equalizer performance. Further, a least mean square algorithm, which has a simple structure and requires a small amount of calculation, may be used as a 'tap coefficient updating algorithm' in the equalizer. However, coefficients typically converge slowly when using the least mean square algorithm, which means the convergence time increases. Thus, this algorithm is typically unsuitable for a multi-path communication environment, in which the speed of data transmissions, and transmission delays, are increased. Accordingly, an equalizer is required which is capable of converging coefficients as fast as possible, during a short duration such as a period of a training signal, for example.

A 'Kalman algorithm' is one of a group of algorithms having fast converging characteristics. However, the Kalman algorithm requires a substantial amount of calculation, thus there are difficulties in applying this algorithm to a communication system. Although substantial advances in hardware have enabled the use of the Kalman algorithm in digital communication systems, the increased processing power needed for these substantial calculations is a problem to be addressed.

SUMMARY OF THE INVENTION

Exemplary embodiments are directed to a method and apparatus for performing channel equalization in a communication system. A filtering circuit filters a received data sequence as a plurality of data values to be stored in a plurality of filter cells. Each filter cell may store at least one data value and may contain a coefficient related to the stored data value. A coefficient updating circuit may update the coefficients based on at least one parameter, and may compare the updated coefficients to a threshold. Based on the comparison, filter cells of selected coefficients may be selected for restoring the received data sequence to its original state.

BRIEF DESCRIPTION OF THE DRAWINGS

The above and other aspects and advantages of the present invention will become more apparent by describing, in detail, exemplary embodiments thereof with reference to the attached drawings, in which.

DETAILED DESCRIPTION OF THE EXEMPLARY EMBODIMENTS

Figure 1:
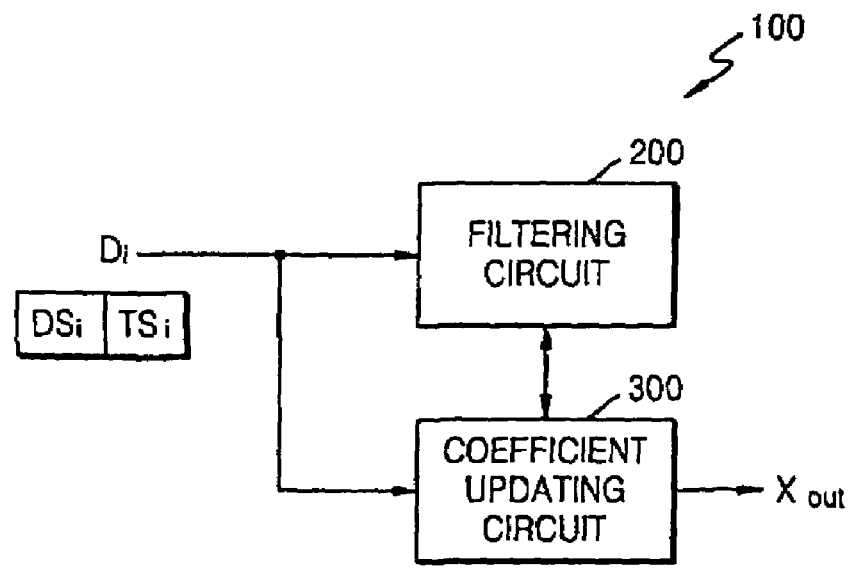
FIG. 1 is a schematic block diagram of a channel equalizer according to an exemplary embodiment of the present invention.

The present invention will now be described more fully with reference to the accompanying drawings, in which exemplary embodiments of the present invention are shown. However, exemplary embodiments of the present invention may be embodied in many different forms and should not be construed as being limited to the exemplary embodiments set forth herein. Rather, these exemplary embodiments are provided so that this disclosure will be thorough and complete and will fully convey the concept of the invention to those skilled in the art. The same reference numerals represent the same elements throughout the drawings.

To provide a context for understanding a method and apparatus for performing channel equalization according to the exemplary embodiments of the present invention, a method of realizing a filter cell (or tap) of a filter using the Kalman algorithm is briefly described.

A data signal D(t) received at an instant of time t (i.e., at time t) can be expressed by Expression (1):

$$D(t) = [D_1(t), D_2(t), \ldots, D_N(t)]^T. \quad (1)$$

In Expression (1), T denotes a transpose matrix. The received data signal D(t) is a signal that is distorted when passing through a multi-path environment which causes interference between signals and multi-path distortion. In a digital communication system such as a DTV, for example, a channel equalizer receives data through a channel, compares the received data with a training signal, determines the characteristics of the channel based on the comparison result, and restores the received data to its original data.

At time t, a filter cell coefficient vector C(t), which is known as a tap coefficient or a coefficient for the equalizer, may be expressed by Expression (2):

$$C(t)=C(t-1)+K(t)\cdot e(t). \quad (2)$$

In Expression (2), e(t) denotes a difference between a signal output from the channel equalizer and a training signal that is known to a receiving side (or the channel equalizer), at time t, and K(t) denotes a Kalman gain that is expressed by Expression (3):

$$K(t)=[\lambda^{-1}\cdot P(t-1)\cdot D(t)]/[1+\lambda^{-1}\cdot D(t)^T\cdot P(t-1)\cdot D(t)]. \quad (3)$$

In Expression (3), $0.9<\lambda<1$, and P(t-1) denotes an error covariance matrix. The error covariance matrix P(t) is expressed by Expression (4):

$$P(t)=\lambda\cdot P(t-1)-\lambda\cdot K(t)\cdot D(t)^T\cdot P(t-1). \quad (4)$$

A coefficient for a filter cell (or tap) may be updated using the Kalman algorithm, as shown by the following equations of Expression (5):

$$C(t)=N+(1\times N)\cdot C$$

$$K(t)=[C\cdot(N\times N)\cdot(N\times 1)]/[(1+C)\cdot(1\times N)\cdot(N\times N)\cdot(N\times 1)]$$

$$P(t)=C\cdot(N\times N)-C\cdot(N\times 1)\cdot(1\times N)\cdot(N\times N). \quad (5)$$

In Expression (5), C denotes a constant, N denotes the sum of the number of feedforward filter cells and the number of feedback filter cells, and (N×N) denotes a matrix consisting of N columns of the sum and N rows of the sum.

Expression (5) reveals that the amount of calculation by a filter using the Kalman algorithm increases when calculating (N×N) and (N×1)·(1×N). The amount of calculation by the filter using the Kalman algorithm may be expressed as 0 ($N^2$).

FIG. 1 is a schematic block diagram of a channel equalizer 100 according to an exemplary embodiment of the present invention. The channel equalizer 100 can be used in a receiver in a digital communication system such as a terrestrial digital television (DTV), high definition television (HDTV), etc., for example. The channel equalizer 100 may include a filtering circuit 200 which receives and filters input data $D_i$ and outputs a filtering result to a coefficient updating circuit 300. The filtering circuit 200 may include a plurality of filter cells. Each filter cell may have a plurality of adjustable coefficients. For each filter cell, the coefficient updating circuit 300 adjusts at least one of the plurality of adjustable coefficients.

Respective received input data sets $D_i$ (i is a natural number) may contain respective training sequences $TS_i$ and data sequences $DS_i$. The coefficient updating circuit 300 equalizes the received training sequences $TS_i$ and updates a given coefficient from the plurality of adjustable coefficients.

Filtering circuit 200 thus contains a plurality of filter cells having adjustable coefficients. Coefficient updating circuit 300 derives an optimum value for at least one coefficient for each filter cell. This may be done using an already-known training sequence and a received training sequence ($TS_i$) transmitted in association with the data sequence ($DS_i$) that is currently being filtered. Thus, channel equalizer 100 may update a corresponding coefficient based on a number of parameters, The parameters may include the obtained optimum value, a Kalman gain, and a difference between the known training sequence and the transmitted training sequence. The channel equalizer 100 compares the updated coefficient with a given (or specified) threshold value, and may reduce the number of filter cells having a coefficient requiring an update, based on the comparison result.

Figure 2:
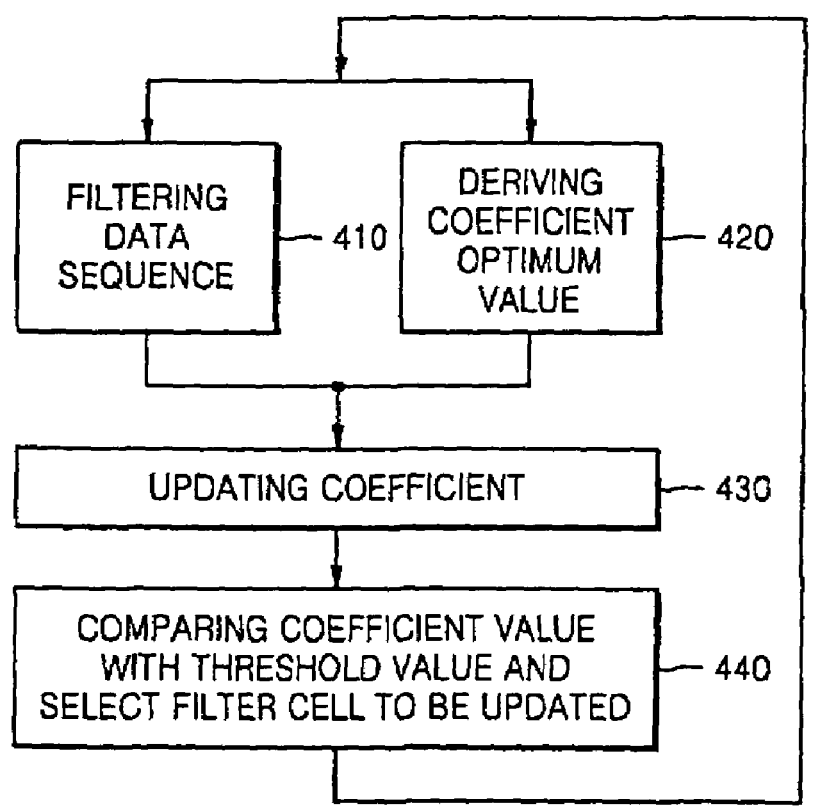
FIG. 2 is a flowchart illustrating a method of equalizing a channel according to an exemplary embodiment of the present invention.

FIG. 2 is a flowchart illustrating a method of performing channel equalization of a channel according to a preferred embodiment of the present invention. Referring to FIG. 2, initially a received data sequence ($DS_i$) is filtered (function 410). An optimum value of at least one of the coefficients may be derived (function 420) using a data sequence which is already known to a receiving side (or to the equalizer 100) and a training sequence ($TS_i$) that is transmitted with a data sequence ($DS_i$) that is currently being filtered. The optimum value represents an adjusted value of a selected coefficient that can be retrieved from a memory in equalizer 100 at the end of an equalization process, for example. The filtering and deriving functions 410, 420 may overlap in time.

The value of the coefficient may be updated (function 430) based on at least one of the plurality of parameters. The parameters, as discussed above, may include the derived optimum value, a Kalman gain and a difference between the transmitted training signal and the training signal which is already known to the receiving side.

The updated coefficient may be compared (function 440) with a given threshold value, and filter cells (or tabs) to be updated may be selected based on the comparison result. For example, filter cells having coefficients less than the threshold value may be set to zero. Those filter cell equal to or exceeding the threshold may thus be selected, thereby potentially reducing the number of filter cells that need to be updated. After the selected coefficient are updated, a new data sequence is filtered.

Figure 3:
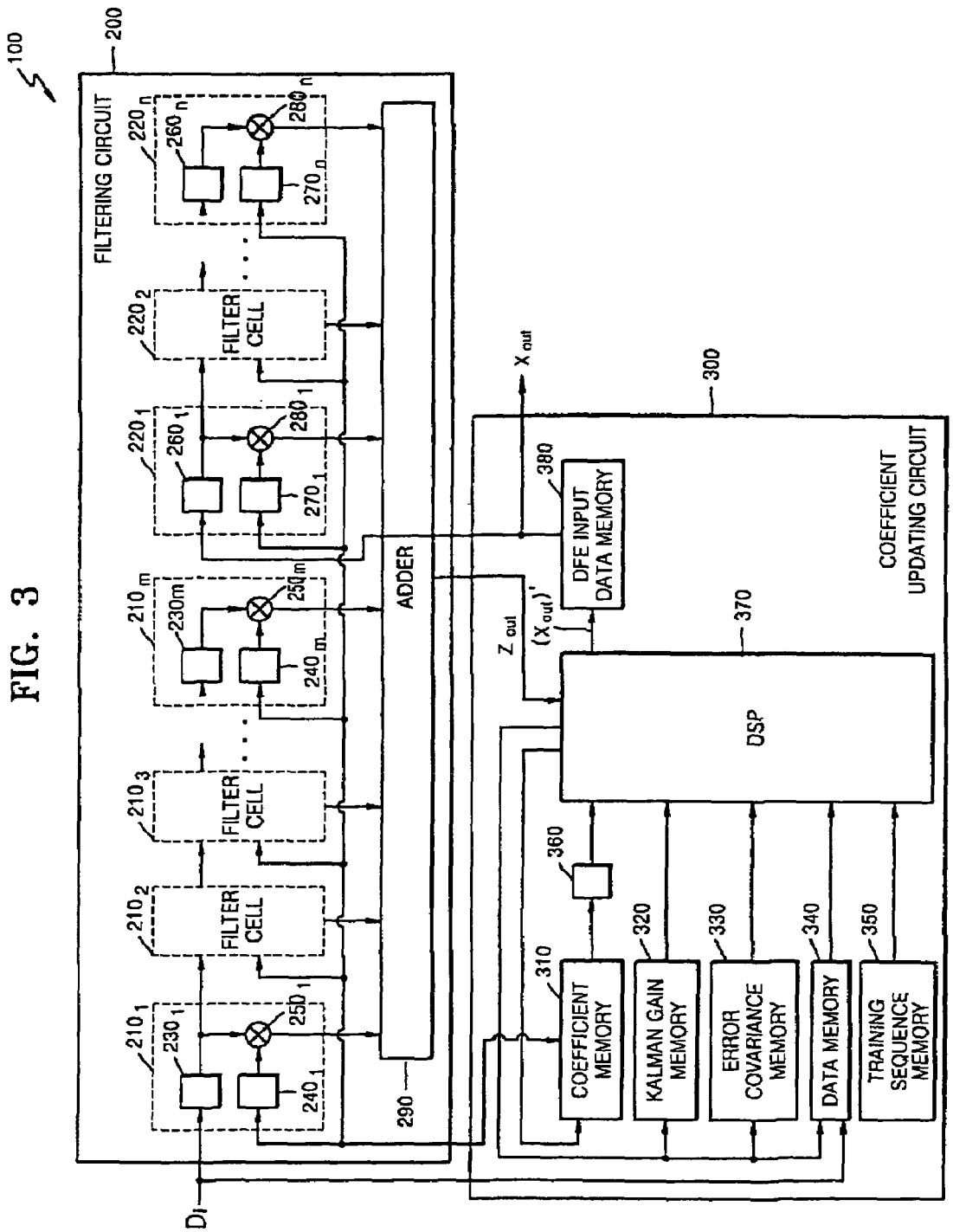
FIG. 3 is a detailed block diagram of a channel equalizer according to an exemplary embodiment of the present invention.

FIG. 3 is a detailed block diagram of a channel equalizer 100 according to an exemplary embodiment of the present invention. Referring to FIG. 3, the channel equalizer 100 receives continuously input data sets $D_i$, and outputs an output signal $X_{out}$. A filtering circuit 200 includes a plurality of filter cells $210_1$ through $210_m$, a plurality of filter cells $220_1$ through $220_n$ (m and n may be natural numbers greater than 2), and an adder 290. Each of the filter cells $210_1$ to $210_m$ may be configured as a feedforward filter; each of the plurality of filter cells $220_1$ through $220_n$ may be configured as a feedback filter.

As shown in FIG. 3, filter cells $210_1$ through $210_m$ may include corresponding data registers $230_1$ through $230_m$, coefficient registers $240_1$ through $240_m$, and multipliers $250_1$ through $250_m$. Filter cells $220_1$ through $220_n$ may include corresponding data registers $260_1$ through $260_n$, coefficient register $270_1$ through $270_n$, and multipliers $280_1$ through $280_n$.

Each data registers $230_1$ through $230_m$ stores a current data value for a data sequence that is related to each coefficient CK. Similarly, each coefficient register $240_1$ through $240_m$ and each coefficient register $270_1$ through $270_n$ stores current values of CK. Each data register $260_1$ through $260_n$ stores a data value for a feedback data sequence currently related to the CK. A training sequence $TS_i$ may be stored in a training sequence memory 350. The training sequence $TS_i$ may be composed of m continuous data having values $T_i(1)$, $T_i(2)$, ..., $T_i(m)$, for example.

When a data sequence $DS_i$ is transmitted to the filtering circuit 200, the filtering circuit 200 receives values $DS_i(t)$ of a data sequence $DS_i$ at a time t. That is, the data sequence $DS_i$ is transmitted to the filtering circuit 200, and the data sequence values $DS_i(t)$ are stored in the filter cells $210_i$ through $210_m$ and the filter cells $220_i$ through $220_n$. At time t, the data sequence value $DS_i(t)$ is transmitted to filtering circuit 200 and stored in data register $230_1$ of the first filter cell $210_1$.

At time t+1, the data sequence value $DS_i(t)$ is transmitted to the data register (not shown) of the second filter cell $210_2$ from the data register $230_1$ of the first filter cell $210_1$. During the transmission of the data sequence value $DS_i(t)$, a next data sequence value $DS_i(t+1)$ is also transmitted to the filtering circuit 200, received by the filtering circuit 200 and stored in the data register $230_1$ of the first filter cell $210_1$.

At time t+2, the data sequence value $DS_i(t)$ is transmitted to the data register (not shown) of the third filter cell $210_3$ from the data register of the second filter cell $210_2$, and the data sequence value $DS_i(t+1)$ is transmitted to the data register of the second filter cell $210_2$ from the data register $230_1$ of the first filter cell $210_1$. At the same time, a next data sequence value $DS_i(t+2)$ is transmitted to the filtering circuit 200 and stored in the data register $230_1$ of the first filter cell $210_1$.

At time t, each of the multipliers $250_1$ through $250_m$, of the respective filter cells $210_1$ through $210_m$, receives a value of a coefficient CK stored in the corresponding coefficient register $240_1$ through $240_m$, and receives a data value stored in the corresponding data register $230_1$ through $230_m$. Also, each of the multipliers $280_1$ through $280_n$, of the respective filter cells $220_1$ through $220_n$, receives a value of a coefficient CK stored in the corresponding coefficient register $270_1$ through $270_n$, and receives a data value stored in the corresponding data register $260_1$ through $260_n$. Each of the multipliers $250_1$ through $250_m$ and the multipliers $280_1$ through $280_n$ multiplies the received two values and provides the multiplication result to the adder 290.

The adder 290 calculates a difference $Z_{out}$ between the sum of the multiplication results received from the multipliers $250_1$ through $250_m$, and the sum of the multiplication results received from the multipliers $280_1$ to $280_n$, and outputs the $Z_{out}$ to a digital signal processor (DSP) 370.

In coefficient updating circuit 300, a coefficient memory 310 stores the coefficients CK for the filter cells $210_1$ through $210_m$, and $220_1$ through $220_n$. A Kalman gain memory 320 stores a Kalman gain (or vector) K(t). An error covariance memory 330 stores an error covariance matrix P(t); and a data memory 340 stores received values of the training sequence $TS_i$. The original training sequence, discussed previously above, is stored in a training sequence memory 350.

A comparator 360 receives signals output from the coefficient memory 310, compares these signals with a given threshold value in response to a given (or specified) control command, and sets values for the output signals (corresponding to CKs) to zero when these signals are less than the threshold value.

The DSP 370 receives signals output from comparator 360, Kalman gain memory 320, error covariance memory 330, data memory 340, training sequence memory 350, and adder 290. The DSP 370 processes a received training sequence $TS_i$, calculates the optimum value of a particular one of coefficients CK for filter cells, and outputs the calculation result to a decision feedback equalizer (DFE) input data memory 380. The DFE input data memory 380 receives signal $(X_{out})^t$ from the DSP 370 and outputs output signal $X_{out}$ to the data registers $260_1$ through $260_n$ of the filter cells $220_1$ through $220_n$.

The DSP 370 performs an equalization of the training sequence $TS_i$. During the equalization of the training sequence $TS_i$, the DSP 370 also rearranges the coefficients CK and allocates a Kalman gain value, an error covariance value, a data value, and a training sequence value for each coefficient, in order to equalize all CKs except for the CKs set to zero by comparator 360.

The equalization of the received training sequence $TS_i$ includes filtering the received training sequence $TS_i$ by the DSP 370, based on the values of the coefficients CK stored in the coefficient memory 310. During the filtering of the training sequence $TS_i$, the stored CKs are repeatedly adjusted by DSP 370, so that the received training sequence $TS_i$ emulates the original training sequence after equalization. As discussed above, the original training sequence is stored in training sequence memory 350. As previously discussed, the optimum values for CK represent adjusted values for the CKs that can be retrieved from coefficient memory 310 at the end of the equalization process.

Figure 4:
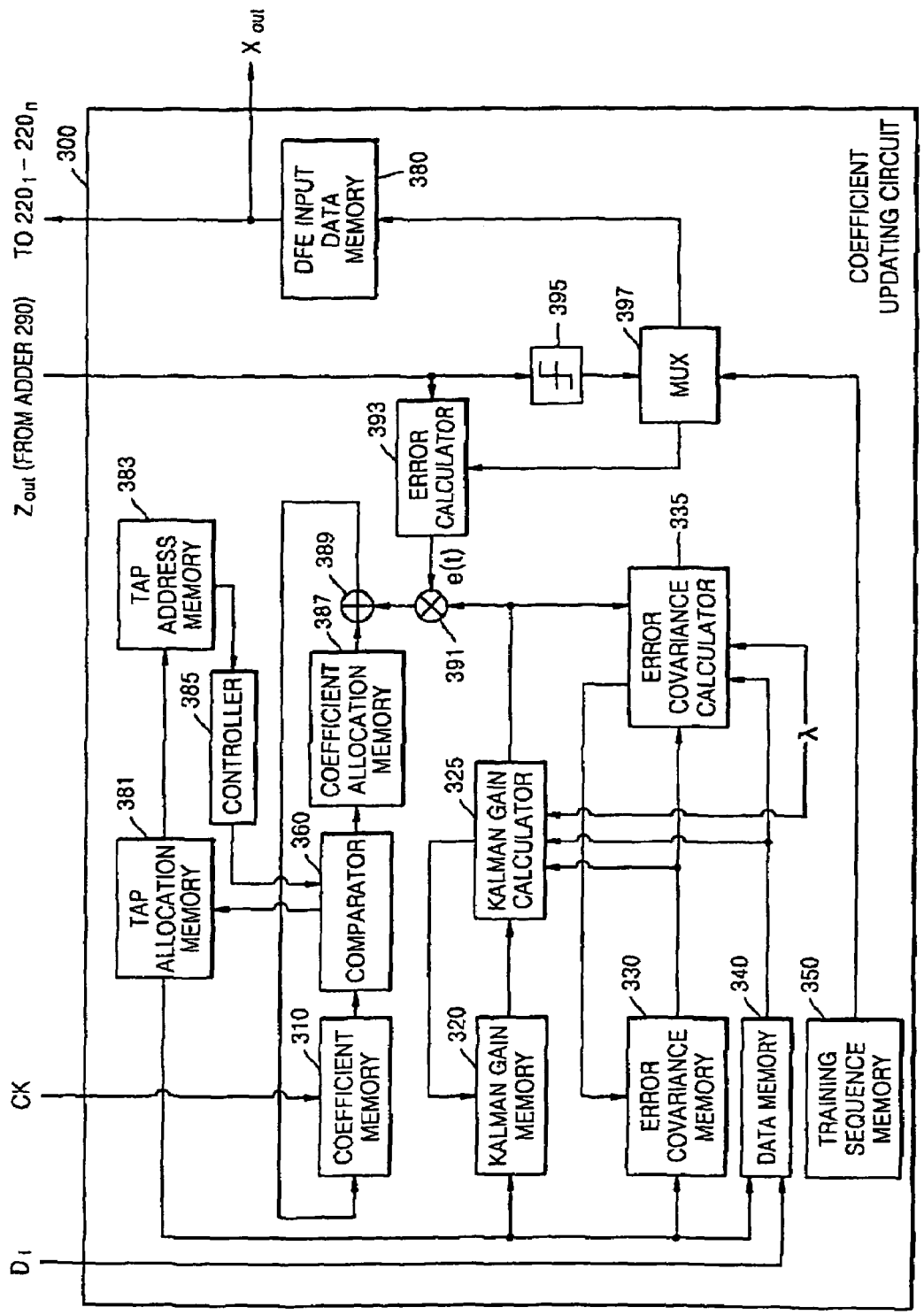
FIG. 4 is a block diagram illustrating the functions of a coefficient updating circuit in FIG. 1.

FIG. 4 is a block diagram of the coefficient updating circuit 300 of FIG. 1, and repeats many of the elements of FIG. 3. Referring to FIG. 4, in general, coefficient updating circuit 300 uses values of coefficients CK stored in the coefficient memory 310, and outputs values obtained by multiplying the values of data sequences $DS_i$, which are stored in the data memory 340, and the values of training sequences $TS_i$, which are stored in the training sequence memory 350, respectively. Also, coefficient updating circuit 300 receives a signal $Z_{out}$ output from the adder 290 and outputs an output signal $X_{out}$.

A controller 385 maintains the number of filter cells (count of sum of feedforward and feedback filters) as an initial value and controls the comparator 360 at an instant of time when comparator 360 starts to operate. As the comparator 360 starts to operate, and during a training period, the controller 385 calculates identification numbers of the filter cells stored in a tap address memory 383, estimates the delay time of a delayed multi-path of a channel, and operates the comparator 360 again after an interval corresponding to the estimated time.

The comparator 360 receives the coefficient values of the filter cells output from coefficient memory 310, compares the received coefficient values of the filter cells with a given threshold value, selects certain coefficient values for comparing and updating, and sets the selected coefficients which are less than the threshold to zero. Then, comparator 360 stores identification numbers of the selected filter cells having the coefficient values which are not set to 0 (i.e., greater than or equal to the threshold value) in a tap allocation memory 381, and stores the coefficient values corresponding to the numbers of the filter cells in a coefficient allocation memory 387.

The numbers of the filter cells are stored in a tap address memory 383, so as to correspond to the initially allocated numbers (initial count) of the filter cells. The numbers of the filter cells stored in tap allocation memory 381 are input to a Kalman gain memory 320, an error covariance memory 330, and data memory 340.

The Kalman gain memory 320 applies the input numbers of the filter cells to the Kalman gain vector stored in the Kalman gain memory 320, so as to generate a new Kalman gain vector. The error covariance memory 330 generates a new matrix using the numbers of the filter cells received from the tap allocation memory 381, as to be described in further detail below. As a result, a new coefficient vector consisting only of the coefficients passing through comparator 360 is generated.

A Kalman gain calculator 325 calculates a Kalman gain to update the current Kalman gain, using a Kalman gain vector output from Kalman gain memory 320, an error covariance matrix output from error covariance memory 330, a data vector received from the data memory 340 at time t, and a value $\lambda$ ($0.9<\lambda<1$). The Kalman gain calculator 325 stores the updated Kalman gain in Kalman gain memory 320.

An error covariance calculator 335 updates the error covariance matrix based on the error covariance matrix output from the error covariance memory 330, the updated Kalman gain vector output from the Kalman gain calculator 325, the data vector received from the data memory 340 at time t, and the value λ (0.9<λ<1). The error covariance calculator 335 stores the updated error covariance matrix in error covariance memory 330.

A multiplexer 397 receives a training sequence from the training sequence memory 350 at time t (during a training period), and inputs the training sequence to an error calculator 393 and the DFE input data memory 380. After the training period, the multiplexer 397 receives $Z_{out}$ passing through the slicer 395, and provides $Z_{out}$ to error calculator 393 and DFE input data memory 380.

The error calculator 393 calculates a difference, e(t), between the output of the multiplexer 397 and the output of adder 290, and transmits the difference e(t) to a multiplier 391. The slicer 395 changes the output of the adder 290 into a value approximately equal to the original transmission signal. The DEE input data memory 380 receives the output of the multiplexer 397 and provides it to data registers $260_1$ through $260_n$ of corresponding filter cells $220_1$ through $220_n$, for example.

A multiplier 391 multiplies the difference e(t) output from the error calculator 393 and an output of the Kalman gain calculator 325 and sends the multiplication result to an adder 389. The adder 389 adds the multiplication result output from the multiplier 391 to a new coefficient vector stored in the coefficient allocation memory 387, and outputs the addition result to the coefficient memory 310. In this case, the coefficient memory 310 receives a signal output from the adder 389, updates the coefficient vector using the signal, and stores the updated coefficient vector. In accordance with the exemplary embodiments, modified Kalman algorithms may be used to minimize the values of error signals when updating coefficients.

Accordingly, coefficient updating circuit 300 is designed to provide a number of a filter cell, which passes through comparator 360 and is input to tap allocation memory 381, to Kalman gain memory 320 and to error covariance memory 330. Coefficient updating circuit 300 may also update a Kalman gain and an error covariance matrix. Therefore, a channel equalizer according to the exemplary embodiments of the present invention may use only small filter cells to calculate a Kalman gain and an error covariance matrix, thereby potentially reducing power consumption.

Additionally, tap allocation memory 381 is capable of generating a new coefficient vector using only necessary filter cells, and may thus effectively update only a distorted portion of a channel which is adversely affecting the performance of the original signal. For this reason, the method and apparatus for forming channel equalization according to the exemplary embodiments of the present invention may be more advantageous than a conventional channel equalizing method of updating coefficients using all filter cells.

Modified Kalman Algorithms

Assuming that a channel equalizer according to the exemplary embodiments of the present invention uses ten filter cells, a filter cell coefficient vector C(t)=[10×1] at time t may be calculated by the following Expression (6):

$$C(t)=[C1, C2, C3, C4, C5, C6, C7, C8, C9, C10]^T. \quad (6)$$

A Kalman gain K(t)=[10×1] can be expressed by Expression (7):

$$K(t)=[K1, K2, K3, K4, K5, K6, K7, K8, K9, K10]^T. \quad (7)$$

An error covariance matrix P(t)=[10×10] can be expressed by Expression (8):

$$P(t) = \begin{bmatrix} P(1,1)P(1,2) \ldots P(1,10) \\ P(2,1)P(2,2) \ldots P(2,10) \\ \ldots \\ \ldots \\ P(9,1)P(9,2) \ldots P(9,10) \\ P(10,1)P(10,2) \ldots P(10,10) \end{bmatrix} \quad (8)$$

Also, data D(t)=[10×1] can be expressed by Expression (9):

$$D(t)=[D1, D2, D3, D4, D5, D6, D7, D8, D9, D10]^T \quad (9)$$

If initial conditions under which the comparator 360 operates are satisfied, and a coefficient vector C(t)=[10×1], which passes through the comparator 360, is equivalent to a value obtained by Expression (10), the numbers of filter cells (or a memory address) having values other than zero, e.g., 1, 2, 7, and 10, may be input to the tap allocation memory 381, and a new filter cell coefficient vector $C_n(t)$=[4×1], which can be expressed by Expression (11), may be stored in coefficient allocation memory 310.

$$C(t)=[C1, C2, 0, 0, 0, 0, C7, 0, 0, C10]^T \quad (10)$$

$$C_n(t)=[C1, C2, C7, C10]^T \quad (11)$$

A Kalman gain $K_n(t)$=[4×1], which is generated in response to an address output from the tap allocation memory 381, can be expressed by Expression (12) as follows:

$$K_n(t)=[K1, K2, K7, K10]^T. \quad (12)$$

An error covariance matrix $P_n(t)$=[4×4], which is generated in response to the address output from the tap allocation memory 381, can be expressed by Expression (13) as follows:

$$P_n(t) = \begin{bmatrix} P(1,1)P(1,2) P(1,7) P(1,10) \\ P(2,1)P(2,2) P(2,7) P(2,10) \\ P(7,1)P(7,2) P(7,7) P(7,10) \\ P(10,1)P(10,2) P(10,7) P(10,10) \end{bmatrix} \quad (13)$$

In this case, data signal D(t)=[4×1] can be described by Expression (14):

$$D(t)=[D1, D2, D7, D10]^T. \quad (14)$$

During a training period, the delay time of a multi-path can be estimated with reference to a value stored in the tap allocation memory 381, and it is possible to continuously reduce the number of filter cells to be updated by operating the comparator 360 again, after a lapse of time corresponding to the delay time of the multipath. In this way, the amount of calculation spent on updating coefficients may be reduced, thereby potentially reducing total power consumption.

While the present invention has been particularly shown and described with reference to exemplary embodiments thereof, it will be understood by those of ordinary skill in the art that various changes in form and details may be made therein without departing from the spirit and scope of the exemplary embodiments of the present invention as defined by the following claims.

What is claimed is:

1. A method of reducing a number of filter cells that require updating in a channel equalizer of a communication system, the method comprising:
   filtering a data sequence into a plurality of data values for storage in a plurality of filter cells having a plurality of adjustable coefficients;
   deriving an optimum value of at least one coefficient among the coefficients;
   updating the at least one coefficient with the derived optimum value to provide at least one updated coefficient value;
   comparing the at least one updated coefficient value to a threshold to eliminate at least one of the filter cells from having to be updated; and
   repeating, at least once, the filtering, deriving, updating, and comparing such that the updating and comparing do not occur for the at least one of the filter cells that is eliminated from having to be updated.

2. The method of claim 1, further comprising:
   setting an updated coefficient value to zero, if the updated coefficient value is less than the threshold.

3. The method of claim 1, wherein deriving an optimum value is performed during filtering a data sequence.

4. A channel equalizing method, comprising:
   filtering a data sequence into a plurality of data values for storage in a plurality of filter cells having a plurality of adjustable coefficients;
   deriving an optimum value of at least one coefficient among the coefficients based on a training sequence associated with the data sequence currently being filtered and a known training sequence;
   updating the at least one coefficient based on the derived optimum value, a Kalman gain, and a difference between the training sequence associated with the data sequence currently being filtered and the known training sequence to provide an updated coefficient value;
   comparing the updated coefficient value to a threshold;
   reducing a number of filter cells with coefficients to be updated, based on the comparison; and
   repeating, at least once, the filtering, deriving, updating, and comparing, such that the updating and comparing do not occur for the filter cells that do not have coefficients to be updated.

5. The method of claim 4, wherein reducing a number of filter cells includes setting an updated coefficient value to zero, if the updated coefficient value is less than the threshold.

6. A coefficient updating circuit of a channel equalizer in a communication system, the circuit comprising:
   storage means storing coefficients related to data values of a received data sequence, at least one data value of the received data sequence received in one of a plurality of filter cells, each filter cell having a coefficient related to the received at least one data value;
   update means updating the coefficients based on at least one parameter;
   compare means comparing the updated coefficients to a threshold; and
   selecting means selecting filter cells of selected coefficients based on the comparison;
   wherein the coefficients of filter cells that are not selected are not updated by the update means, and
   wherein the coefficients of the filter cells that are not selected are not compared to the threshold.

7. The circuit of claim 6, wherein the received data sequence includes an associated training sequence, the circuit further comprising:
   deriving means determining an optimum value for each coefficient based on the associated training sequence and a known training sequence.

8. The circuit of claim 7, wherein the update means updates the coefficients based on one or more of the optimum values, a Kalman gain value, and a difference value between the associated training sequence and the known training sequence.

9. The circuit of claim 6, wherein the compare means;
   sets an updated coefficient to zero, if a value of the updated coefficient is less than the threshold, else
   selects filter cells to be updated, for updated coefficients equal to or exceeding the threshold.

10. A channel equalizer, comprising:
    a filtering circuit filtering a data sequence and having a plurality of filter cells to receive data values of the filtered data sequence, each filter cell having an adjustable coefficient; and
    a coefficient updating circuit deriving an optimum value of at least one coefficient among a plurality of coefficients during the filtering, determining an updated coefficient value based on the optimum value, comparing the updated coefficient value to a threshold, and setting a the updated coefficient value to zero, if the updated coefficient value is less than the threshold;
    wherein the coefficient updating circuit does not determine the updated coefficient value or compare the updated coefficient value for filter cells in which the updated coefficient value is set to zero.

11. A channel equalizer, comprising:
    a filtering circuit filtering a data sequence and having a plurality of filter cells to receive data values of the filtered data sequence, each filter cell having an adjustable coefficient; and
    a coefficient updating circuit deriving an optimum value for at least one coefficient among a plurality of coefficients during the filtering based on a training sequence associated with the data sequence that is currently being filtered and a known training sequence, determining an updated coefficient value based on the optimum value, a Kalman gain, and a difference between the associated training sequence and the known training sequence, comparing the updated coefficient value to a threshold, and reducing a number of the filter cells having coefficients to be updated, based on the comparison;
    wherein the coefficient updating circuit does not determine the updated coefficient value or compare the undated coefficient value for filter cells that do not have coefficients to be updated.

12. An apparatus which implements channel equalization in a communication system in accordance with the method of claim 1.

13. An apparatus which implements channel equalization in a communication system in accordance with the method of claim 4.

14. A channel equalizer in a communication system operating in accordance with the method of claim 1.

15. A channel equalizer in a communication system operating in accordance with the method of claim 4.

16. The method of claim 1, wherein a training sequence is associated with the data sequence.

17. The method of claim 16, wherein the channel equalizer includes a known training sequence.

18. The method of claim 17, wherein the associated training sequence is the same as the known training sequence.

19. The method of claim 17, wherein the associated training sequence is not the same as the known training sequence.

20. The method of claim 4, wherein repeating, at least once, the filtering, deriving, updating, and comparing comprises:

repeating, at least once, the filtering, deriving, updating, comparing, and reducing, such that the updating, comparing, and reducing do not occur for the filter cells that do not have coefficients to be updated.

* * * * *